(12) United States Patent
Owensby

(10) Patent No.: US 7,244,489 B2
(45) Date of Patent: Jul. 17, 2007

(54) FOAMED ARTICLE WITH ABSORBING CHARACTERISTICS ON ONE SIDE AND NON-ABSORBING CHARACTERISTICS ON THE OTHER SIDE AND METHOD FOR PRODUCING SAME

(75) Inventor: Joseph E. Owensby, Spartanburg, SC (US)

(73) Assignee: Cryovac, Inc., Duncan, SC (US)

( * ) Notice: Subject to any disclaimer, the term of this patent is extended or adjusted under 35 U.S.C. 154(b) by 179 days.

(21) Appl. No.: 10/436,225

(22) Filed: May 12, 2003

(65) Prior Publication Data

US 2004/0229030 A1 Nov. 18, 2004

(51) Int. Cl.
*B32B 5/14* (2006.01)

(52) U.S. Cl. .............................. 428/310.5; 428/216.6; 428/319.3; 428/319.7

(58) Field of Classification Search ............. 428/310.5, 428/319.3, 319.7, 316.6
See application file for complete search history.

(56) References Cited

U.S. PATENT DOCUMENTS

| | | | |
|---|---|---|---|
| 3,386,877 A | 6/1968 | Skochdopole et al. |
| 3,410,932 A | 11/1968 | Woodson et al. |
| 3,443,007 A | 5/1969 | Hardy |

(Continued)

FOREIGN PATENT DOCUMENTS

EP 0 286 571 A 10/1988

EP 1020846 A2 * 7/2000

OTHER PUBLICATIONS

U.S. Appl. No. 2002/0043736A1, Marakami et al, "Shape Memory Foam Material," Apr. 18, 2002.*

*Primary Examiner*—Hai Vo
(74) *Attorney, Agent, or Firm*—Alston & Bird LLP

(57) ABSTRACT

There is provided a multi-layered foamed article. The foam article has a layer of foam material on either side of an inner peel layer disposed roughly in the middle of the foam. The portion of the foam in closest proximity to the peel layer is subjected to the greatest amount of heat during extrusion forming mostly large open cell foam. The foam near the surface of the multiplayer foam article is cooled by the atmosphere or contact with cooling surfaces and comprises mostly small closed-cell foam. There is also provided a method for making a multi-layer foamed article by co-extruding an inner peel layer sandwiched between two expanded layers of a foam material. Each of the expanded foam layers on either side of the peel layer of the article is easily peeled or stripped from the peel inner layer and the multi-layer article is converted into a foamed article with absorbing characteristics on one side and non-absorbing characteristics on the other side. Thus, the foam is predominantly open-cell on one side of the structure and predominantly closed-cell on the opposing side. The open-cell portion of the article is highly absorbent and easily soaks up liquids. The closed cell portion of the foam article acts as a waterproof layer preventing liquid from moving all the way through the thickness of the foam. After blowing the polymer melt, the extrusion product comprises a foam article with a peel layer disposed roughly in the middle of the foam. A preferred embodiment of the multi-layer article is polystyrene foam for the two outer layers and a polyethylene film as the inner peel layer.

9 Claims, 4 Drawing Sheets

AS EXTRUDED

U.S. PATENT DOCUMENTS

| | | |
|---|---|---|
| 3,461,496 A | 8/1969 | Winstead |
| 3,610,509 A | 10/1971 | Winstead |
| 3,816,233 A | 6/1974 | Powers |
| 3,975,567 A | 8/1976 | Lock |
| 3,978,266 A | 8/1976 | Lock |
| 4,515,239 A * | 5/1985 | Blatt et al. .................. 181/290 |
| 4,776,356 A | 10/1988 | Jou et al. |
| 4,941,232 A | 7/1990 | Decker et al. |
| 5,147,896 A * | 9/1992 | York .......................... 521/79 |
| 5,618,853 A | 4/1997 | Vonken et al. |
| 5,833,894 A | 11/1998 | Lanzani et al. |
| 6,071,580 A | 6/2000 | Bland et al. |
| 6,174,471 B1 * | 1/2001 | Park et al. ..................... 264/53 |
| 6,237,717 B1 * | 5/2001 | Osanai et al. ................ 181/294 |
| 6,279,738 B1 * | 8/2001 | Mungo et al. ........... 206/213.1 |
| 6,720,069 B1 * | 4/2004 | Murakami et al. ....... 428/319.3 |
| 6,900,145 B2 * | 5/2005 | Tilton et al. ................ 442/181 |

* cited by examiner

AS EXTRUDED

AFTER PEELING

FOAMED ARTICLE WITH ABSORBING CHARACTERISTICS ON ONE SIDE AND NON-ABSORBING CHARACTERISTICS ON THE OTHER SIDE AND METHOD FOR PRODUCING SAME

BACKGROUND OF THE INVENTION

1. Field of the Invention

The present invention relates generally to a foam article having absorbing characteristics on one side and non-absorbing characteristics on the other side and the product from which the foam article is made. This invention also relates to the method for making the foam articles. More particularly, the foam article is an open cell expanded plastic foam on one side of the article and closed cells on the other side of the article.

2. Description of the Prior Art

Expanded plastic foams have long been known. In particular, various expanded open cell plastic foams have a wide range of uses especially for absorbing liquids. Such plastic foams may be produced by extruding a thermoplastic synthetic resin together with a blowing agent, in particular a gaseous blowing agent, from an annular or slot die or co-extrusion die. The blowing agent is distributed throughout the melted plastic and upon extrusion expands so that very fine bubbles form in the plastic article to cause expansion of the plastic. Smaller or larger bubbles are obtained depending on the process conditions with regard to the temperature and extrusion rate. In the typical process the temperature gradient across the expanded article results in cooler outer surfaces on each side of the expanded foam that results in the outer surfaces having closed cells. Such foams have closed cells on the outside surfaces of the foam article and open cells in the interior of the article. These foams, while having excellent insulating properties do not have very useful absorbing properties.

An expanded plastic foam in which the cells are open, i.e., have a through passage, shows completely different characteristics. Open cell expanded plastic foams are capable of absorbing liquids similar to a sponge. In the case of such open cell foams, the cells are connected to one another via the gas phase.

Various methods are available to obtain expanded plastic foams having open cells. One method of obtaining an open cell structure is to exert mechanical pressure on the expanded plastic foam thereby opening the previously closed cells. In this method the compression forms open cells on the interior of the expanded foam and closed cells on the outsides of the expanded foam. However, mechanical compression of the outside of an extruded, expanded foam article such as that disclosed in Hardy, U.S. Pat. No. 3,443,007, does not provide a foam structure having open cells available for absorption. Another mechanical process for the formation of open cells is to stretch the extrudate as it exits the extruder and expands from the extrusion die to form a unique structure as shown in U.S. Pat. No. 6,071,580 to Bland, et al.

Chemical processing is also used to produce an open cell structure, such as by using an excess of nucleating agent without a blowing agent as taught in U.S. Pat. No. 5,618,853 to Vonken, et al. However, such structure does not provide a foam structure having both an open cell and a closed cell structure. The patents to Jou, et al., U.S. Pat. No. 4,776,356 and U.S. Pat. No. 3,386,877 to Skochdopole, et al., teach selectively varying the temperature to obtain both open and closed cells in a foamed plastic article.

It is therefore desirable to provide an expanded foam article that has absorbing characteristics on one side and non-absorbing characteristics on the other side and to provide a method for making such an article.

SUMMARY OF THE INVENTION

In accordance with the present invention there is provided a multi-layered foam article. The foam article has a layer of foam material on either side of an inner peel layer disposed roughly in the middle of the foam. The portion of the foam in closest proximity to the peel layer is subjected to the greatest amount of heat during extrusion forming mostly large open cell foam. The foam near the surface of the multi-layer foam article is cooled by the atmosphere or by contacting cooling surfaces and, therefore, comprises mostly small closed-cell foam. Each of the expanded foam layers on either side of the peel layer of the article is easily peeled or stripped from the peel inner layer to convert the multi-layer article into a foamed article with absorbing characteristics on one side and non-absorbing characteristics on the other side. Each of the resulting foam layers is a unitary foam structure. The foam is predominantly open-cell on one side of the structure and predominantly closed-cell on the opposing side. The open-cell portion of the article is highly absorbent and easily soaks up liquids. The closed cell portion of the foam article acts as a waterproof layer preventing liquid from moving all the way through the thickness of the foam. A preferred embodiment of the multi-layer article is a polystyrene foam for the two outer layers and a polyethylene film as the inner peel layer. However, the invention is broadly applicable to any combinations of foam and peel layer that may be co-extruded.

Another aspect of the invention there is the provision of a method for making a multi-layer foamed article. The method for producing the multi-layer foam article is to co-extrude an inner peel layer sandwiched between two expanded layers of a foam material. After blowing the polymer melt, the extrusion product comprises a foam article with a peel layer disposed roughly in the middle of the foam. The starting materials for the expanded plastic foam are at least one polymer and one gaseous blowing agent and/or one nucleating agent. As with traditional foam blowing, a heat gradient occurs through the thickness of the foam as the foam is extruded and blown. The heat gradient is maintained so that the cells at the hot center of the foam continue to expand and eventually result in open-cells while the cells at the cool surfaces of the foam do not over expand and form closed-cell skins. The peel layer has a dissimilar composition from the foam layers and does not readily adhere to the foam layers.

It is therefore, an object of the present invention to provide a foamed article with absorbing characteristics on one side and non-absorbing characteristics on the other side.

Another object of the present invention is to provide a method for producing a foamed article with absorbing characteristics on one side and non-absorbing characteristics on the other side.

Other objects, features and advantages of the present invention will become apparent from the following detailed description of the invention taken in conjunction with the accompanying drawings.

BRIEF DESCRIPTION OF THE DRAWINGS

Figure 1:
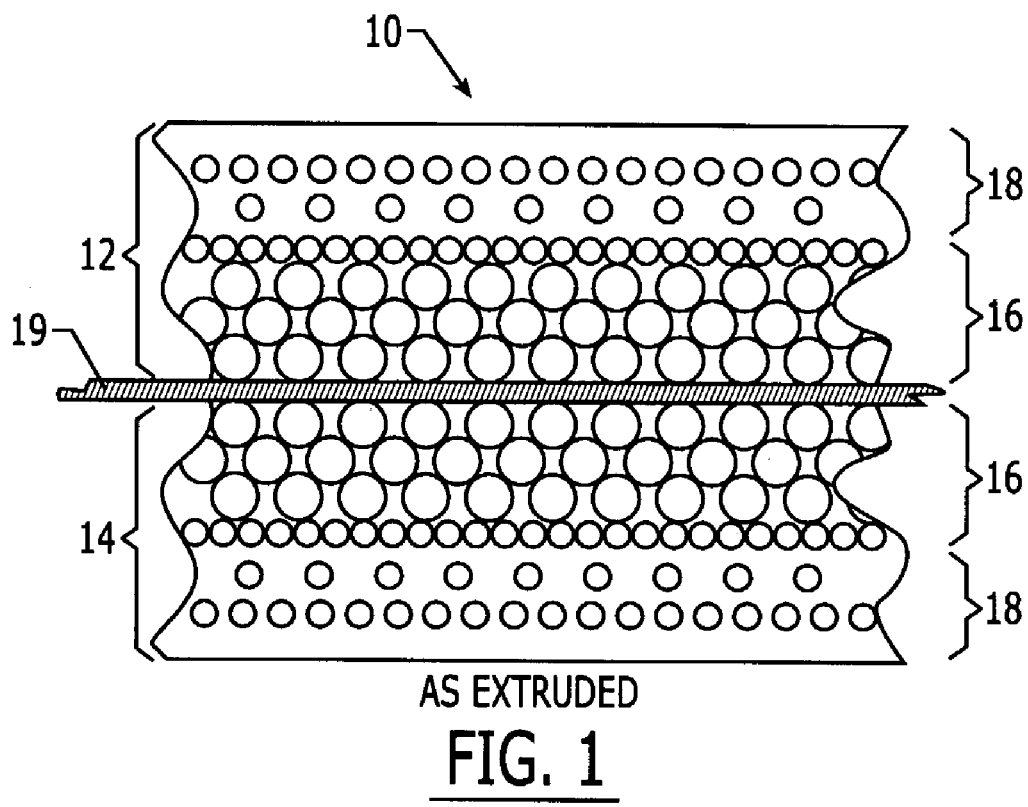
Figure 2:
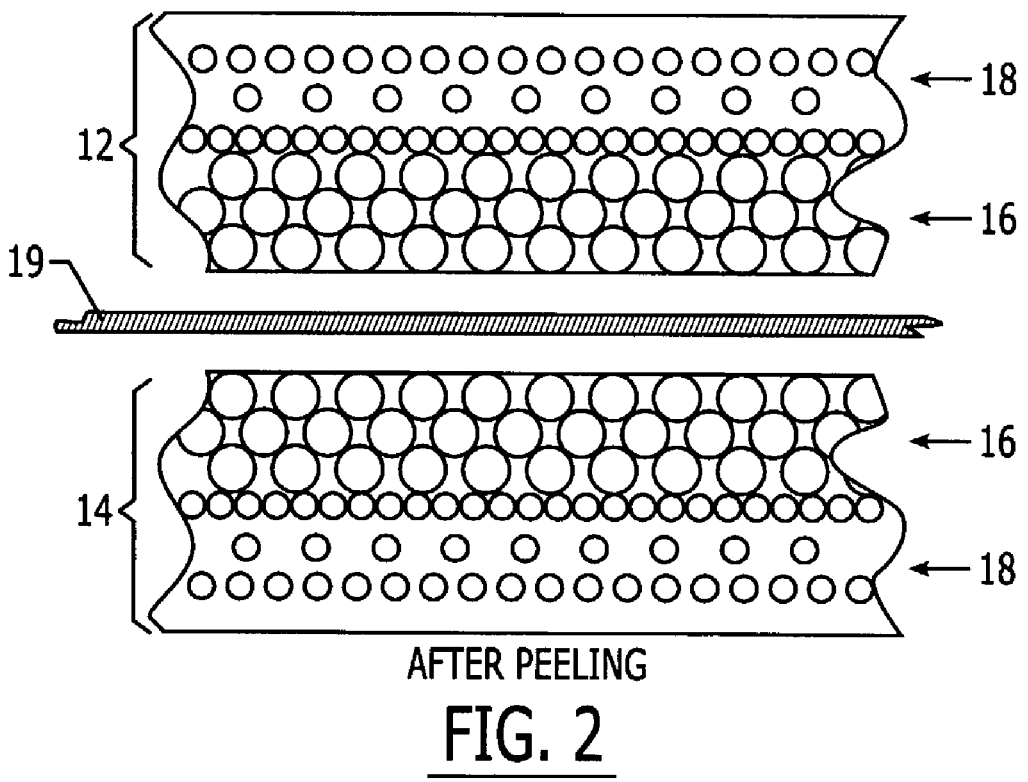
Figure 3:
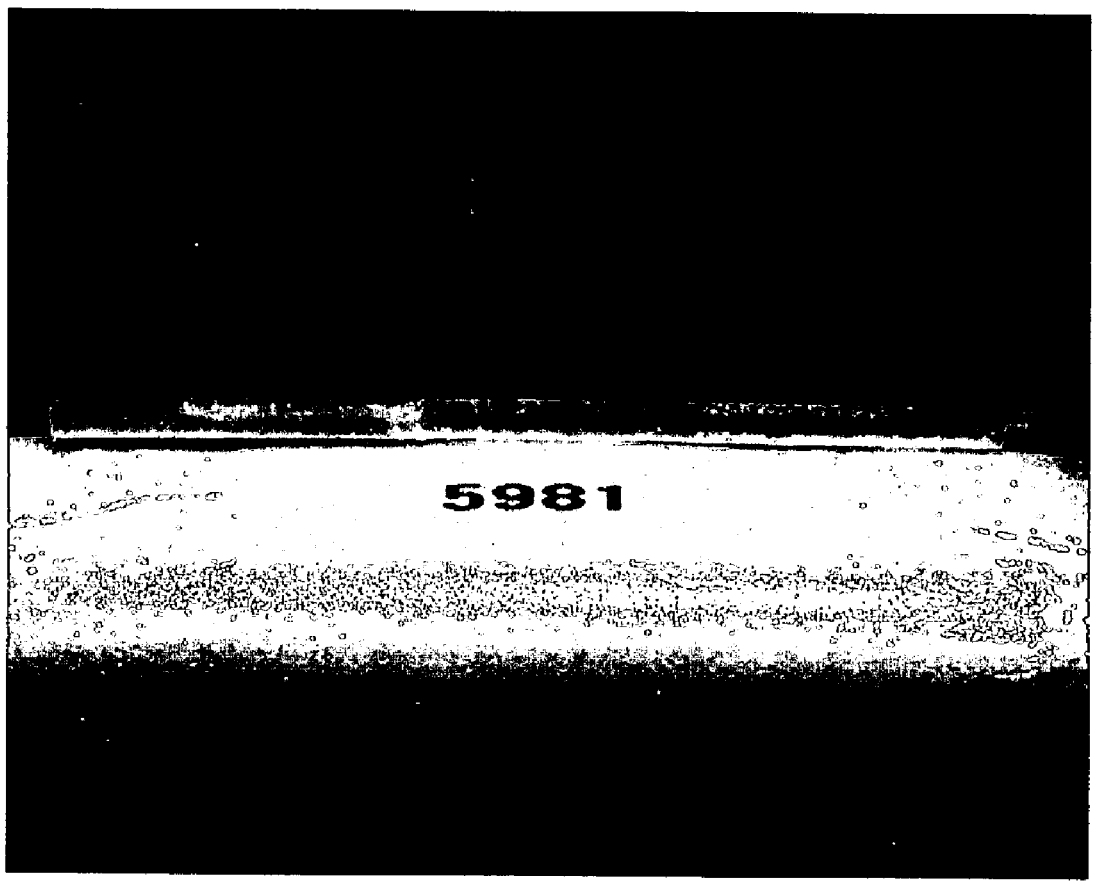
Figure 4A:
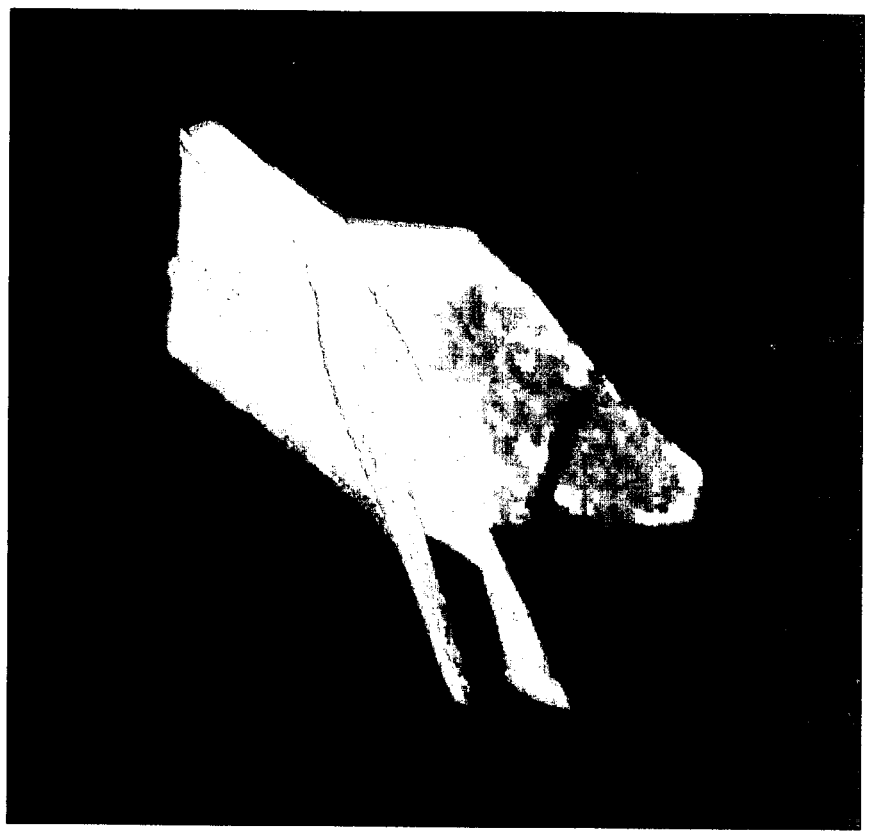
Figure 4B:
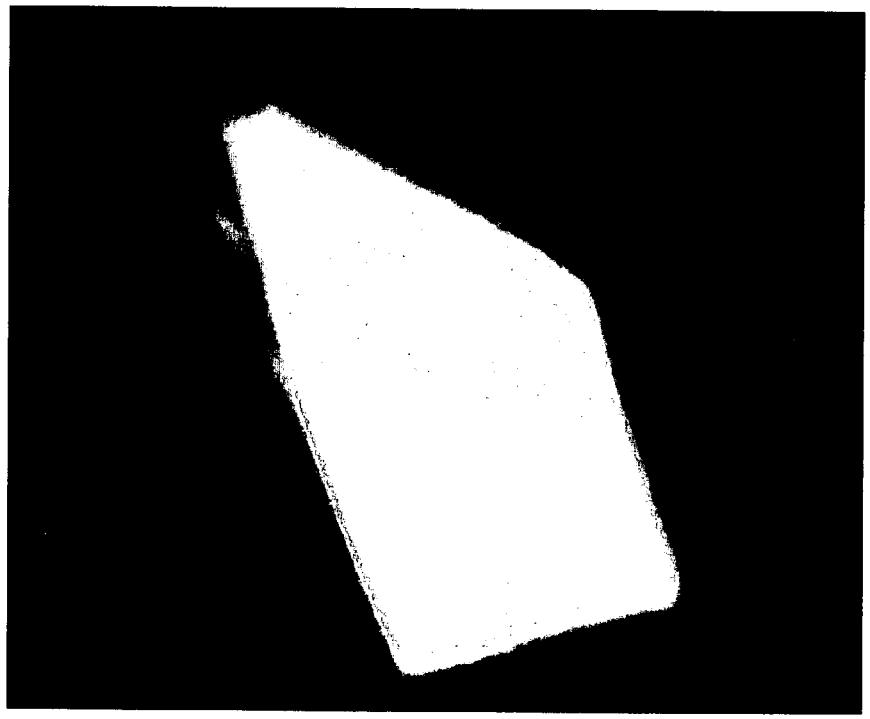
Figure 5A:
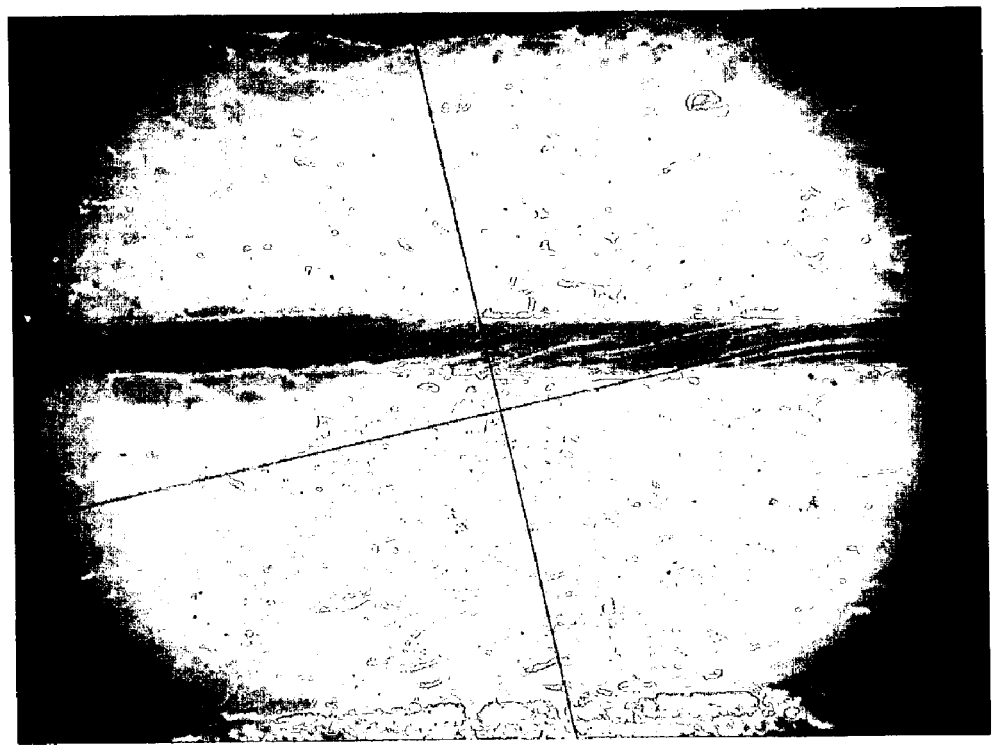
Figure 5B:
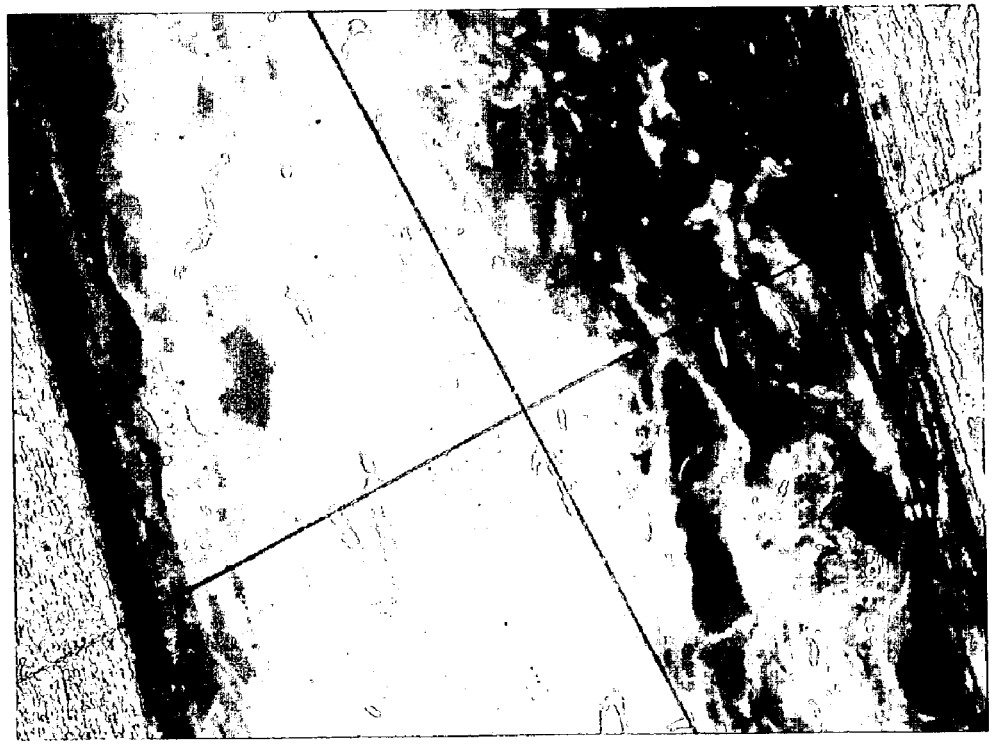

Having thus described the invention in general terms, reference will now be made to the accompanying drawings, which are not necessarily drawn to scale, and wherein:

FIG. 1 is a schematic longitudinal cross section view of a multi-layer foamed article of the present invention showing an inner layer and two outer layers;

FIG. 2 is a schematic longitudinal cross section view of a foamed article having absorbing characteristics on one side and non-absorbing characteristics on the other side;

FIG. 3 is a photograph of a cross section view of a conventional polystyrene foam with approximately 50% open cells;

FIG. 4A is a photograph of a sample of an expanded polystyrene foam partially separated from an inner polyethylene layer showing that an iodine solution soaked into the open cell surface adjacent the inner layer;

FIG. 4B is a photograph of a sample of an expanded polystyrene foam partially separated from an inner polyethylene layer showing that an iodine solution did not soak into the closed cell surface side of the polystyrene layers;

FIG. 5A is a highly enlarged photograph of a cross section view of a foam sheet with a solid core made according to the present invention; and FIG. 5B is an enlarged photograph of a layer of expanded foam from FIG. 5A that has been peeled showing that iodine was absorbed into the right side of the foam's open cells.

DETAILED DESCRIPTION OF THE INVENTION

The present invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring more particularly to the drawings, there is shown in FIG. 1 a foam article 10 forming a multi-layer structure comprising, a pair of foamed outer layers 12, 14 having open cells 16 and closed cells 18, and an inner layer 19 that is separated from the foam outer layers after extrusion. The foam outer layers 12, 14 are co-extruded with the inner layer 19. The outer layers have open cells adjacent the inner layer while the closed cell portion is on the outsides.

The multi-layer foam article is produced by co-extruding an inner peel layer within a dissimilar polymer foam material. As with conventional expanded foams, a heat gradient occurs through the thickness of the foam as the foam is extruded and blown. The heat gradient is maintained so that the cells at the hot center of the foam continue to expand and eventually result in open-cells while the cells at the cool surfaces of the foam do not over expand and form closed-cell skins. After blowing, the extrusion product comprises a foam article with an inner peel layer disposed roughly in the middle of the foam. The foam in close proximity to the peel layer has been subjected to the greatest amount of heat and foaming and, therefore, comprises mostly large open-celled foam, while the foam near the surface of the intermediate product has been cooled by the atmosphere and, therefore, comprises mostly small closed-cell foam. The inner peel layer has a dissimilar composition from the foam layers and does not readily adhere to the foam layers. A preferred embodiment utilizes polystyrene foam in combination with a polyethylene film. However, the invention is broadly applicable to any combinations of foam and peel layer that may be co-extruded.

As shown in FIG. 2, each of the two foam layers of the multi-layer article is peeled from the inner layer resulting in a unitary foam structure. The foam is predominantly open-cell on one side of the structure and predominantly closed-cell on the opposing side. The open-cell portion of the article is highly absorbent and easily soaks up liquids. The closed-cell portion of the article may act as a waterproof layer and prevents liquid from moving all the way through the thickness of the foam.

The outer layers of the article are formed of thermoplastic foam such as alkenyl aromatic polymers, preferably a styrene polymer such as polystyrene (PS), polystyrene copolymers (PSC), acrylonitrile/butadiene/styrene copolymer (ABS), styrene/maleic anhydride and high impact polystyrenes (HIPS). Preferred alkenyl aromatic polymer foams comprise polystyrene of about 125,000 to about 300,000 weight average molecular weight, about 135,000 to about 200,000 weight average molecular weight according to size exclusion chromatography. One particularly preferred polystyrene is STYRON® 685D, a high heat resistance, high tensile strength and high stiffness, general-purpose polystyrene available from The Dow Chemical Company. While the styrenes are preferred, it should be understood that other therrnoplastic might be used to make the foams. These thermoplastics may include, for example polyolefins, polyester, an ethylene/propylene terpolymer, polyvinyl chloride and polyphenylene oxide, cellulosic polymers, polycarbonates, starch-based polymers, polyetherimides, polymethylmethacrylates, copolymer/polymer blends, rubber modified polymers and the like. Further, the foams may include blends of thermoplastic polymers.

The inner peel layer serves as a delamination surface. The inner peel layer is a polyolefin, such as polyethylene (PE), low density polyethylene (LDPE), polypropylene (PP), polyethylene terephthalates (PET). A preferred inner peel layer is a PETROTHENE® NA345-013, a low density polyethylene film extrusion grade from Equistar Chemicals, LP. These films are preferably extruded at a thickness of about 3 mils.

The starting materials for making the expanded foam layers include at least one polymer and one gaseous blowing agent and/or one nucleating agent. The nucleating agent may also serve as a gaseous blowing agent and conversely the gaseous blowing agent may serve as a nucleating agent. Preferably the polymer is polystyrene in an amount up to about 95% by weight, the nucleating agent is preferably talc, chalk, sodium carbonate, sodium bicarbonate and/or citric acid, in an amount of up to about 3% by weight.

The blowing agents used are generally saturated, unsaturated or cyclic hydrocarbons, halogenated hydrocarbons, alcohols, water, nitrogen, carbon dioxide and mixtures thereof. Preferred blowing agents are methane, ethane, ethene, propane, propene, n-butane, 1-butene, 2-butene, isobutane, isobutene, n-pentane, isopentane, 2,2-dimethylpropane, cyclopentane, and mixtures thereof. Isopentane is especially preferred. It is also possible to use only n-butane, particularly in the production of polystyrene foam. In general, carbonic acid, water, nitrogen, talc, chalk, sodium carbonate, sodium bicarbonate and/or citric acid, in an amount of about 0.05 to 6% by weight, preferably about 0.1 to about 5% by weight based on the polymer melt, are added as nucleating agent. One especially preferred blowing agent is SAFOAM® FPE-50, a chemical nucleating and blowing agent from Reedy International In making extended foams, other additives may be incorporated such as inorganic fillers, pigments, antioxidants, acid scavengers, ultraviolet absorbers, flame retardants, processing aids, extrusion aids, surfactants to facilitate absorption and the like.

A preferred process for making the multi-layer article of the present invention is to co-extrude an A/B/A layer struc ture. A sample of the multi-layer expanded foam article may be made using a tandem 2½ to 3½ inch foam extrusion line. The PS material is melted and expanded with a blowing agent and about a nucleating agent. The PE layer is extruded through a 2½-inch single screw extruder producing an extrusion melt temperature of approximately 385° F. Temperatures may be varied as need for proper matching of melt viscosities and extrusion needs. These two melt streams are combined inside an annular co-extrusion die to co-extrude the A/B/A layer structure where the A layers are the foam layers and layer B is the inner peel layer. Extrusion temperatures are such that the PS melt reaches a temperature of about 400° F. before being cooled to approximately 300° F. at the die exit. The extrusion temperature of layer A is such that there exists a central portion of open cells in the structure. There are closed cells near the outside of each surface of the PS foam, while there are open cells near the inside surfaces of both PS foams, and the area that is in communication with the PE layer.

After the multi-layer article is cooled, the sheet may be delaminated by simply pulling the three layers apart. The result is that there are three separate sheets. The center PE sheet is solid. There are two PS foam sheets. As shown in FIG. 2, the A layer sheets have outer surfaces that are smooth, closed cell foam; whereas, the inner surfaces of the foam sheets has open cells.

The foams of the A layers preferably have an open cell content of about 50% or more, most preferably about 70% or more. The open cell content of the foam is measured using a pyctnometer. This instrument is basically an air displacement-measuring device that can measure the volume of the foam that can be filled with air. Dividing this volume by the geometric volume of the foam gives the percentage of "open cells". The expanded foam has an average cell size of about 0.005 inches with some cells as large as 0.020 inches diameter according to ASTM D3576-77. Open cell sizes are on the average larger than closed cells. However, sometimes the cells collapse slightly when they rupture and allow the blowing agent gases to escape thus reducing the internal pressure for the cells. The foam preferably has an equivalent average pore size of about 5 micrometers or more, preferably about 10 micrometers or more. The foam has a density of about 0.05 g/cc. to about 0.50 g/cc according to ASTM D792-98. When it is desired to make foam that is to be used as a meat tray the density is preferably about 0.1 g/cc.

The open cell formation is at least partially controlled by the cooling of the foam. If the extrudate cools quickly enough, the cell growth is halted before the cells rupture. The percentage of open cells goes from very high to very low over a change in melt temperature of only several degrees. Because the outside can cool much quicker than the core of the foam, is why open cells are obtained in the center of the foams, and closed cells on the outside. There is also an opportunity for some of the dissolved gas in the foam to diffuse out of the material, and this does not contribute to foam formation, or cell growth. Either way, the surface of the foam is much more likely to be closed cell.

The term "cells" is to be understood as meaning the cavities contained in the expanded plastic foam. These cells are closed when the cell walls surrounding the cavity are composed of plastic that is unperforated or impermeable to a medium in another manner. The term open cells is used when at least two of the cell walls surrounding the cavity have orifices, so that an exchange of material, in particular an exchange of fluid media, is possible between adjacent cells.

The present foam is useful in a variety of absorbency applications such as food or barrier packaging; industrial and hydraulic oil capture and absorption, cleaning, and baby or adult diapers. Sheet foam is also particularly adaptable to being thermoformed or otherwise molded and shaped into meat trays or other food packaging forms. The sheet form is also particularly adaptable to being employed as an insert or absorbent pad in a meat tray. Any type of meat can be packaged in trays with absorbent inserts. It is also advantageous to package poultry in such trays since poultry exudes relatively large quantities of liquid.

EXAMPLES

Example 1

A conventional expanded polystyrene expanded foam was produced with closed cell skins that are inherent in the cooling process. A colored penetrant was applied to a cut edge of the foam and the penetrant was wicked into the open cell portion of the foam.

The results are shown in sample 5981 shown in the photograph of FIG. 3 wherein there is shown a section of an expanded foam having about 50% open cells and 50% closed cells. The photograph was taken at a magnification of 125%. The open cell area can be seen as the dark area in the center of foam where the colored penetrant wicked into the foam. The open cell portion is confined to the center of the foam and is clearly visible due to the darker portion stained by the wick fluid. Traditional absorbing foams have varying levels of open cells but all have a skin that is mostly non-foamed. This skin prevents the open celled portion of the foams from being used in absorbing applications.

Example 2

A sample of a foam article of this invention was prepared by co-extruding a three-layer structure. The center layer was polyethylene. The outer layers were polystyrene/blended with regrind that contained a blowing agent dissolved in the polymer melt to cause the extrudate to foam after it exited the extruder and the pressure dropped below the critical foaming pressure. A sample of the expanded foam article of the present invention was made using a tandem 2½ to 3½-inch foam extrusion line for producing foams.

The outer layers, layers A, were made by extruding a blend of virgin PS resin, with approximately 25–40% of regrind. The regrind was mostly PS resin, but also contains residual materials of PE, EVOH and styrene/butadiene copolymers. The blowing agent was 3% isopentane and nucleation was with Reedy International SAFOAM® PF40E added at 0.5%. Extrusion temperatures were such that the melt reached a temperature of 400° F. before being cooled to approximately 300° F. at the die exit. The solid PE layer was extruded with a 2½-inch single screw extruder producing a melt temperature of approximately 385° F. These two melt streams were combined inside a proprietary annular co-extrusion die to co-extrude an A/B/A structure where the A was the foam outer layer and B was the solid inner layer. The extrusion temperature of layer A was such that there exist a central core layer of open cells in the structure. The overall extrusion rate was about 185 pounds per hour on this laboratory line. The net effect was an A/B/A structure that had PS foam skins about 100 mils thick, and a PE core layer that was several mils thick.

Because of the temperature profile in the foam, there were closed cells near the outside of each surface of the PS foams, while there were open cells near the inside surfaces of both PS foams, and the area that was in communication with the PE layer. The density of the foam structures was approximately 0.1 g/cc. After the foam was cooled, it was delaminated by pulling the three layers apart. Because of the limited adhesion between the PE inner layer and the PS outer layers, the structure could be easily delaminated, thus exposing the center open celled portion of the foam. The result is that there are three separate sheets. The center PE sheet is solid. The outer sheets were two PS foam sheets. These sheets had an outer surface that is smooth, closed cell foam. The inner surface of the PS foam sheets had open cells.

The layers were manually separated and using a colored penetrant to identify the sections of the foam that absorbed penetrant permeation tests were conducted. Crystal iodine tincture was used as a penetrant, as it readily absorbs into the open cells of the foam and its color can be easily seen with the naked eye. When the foam was manually peeled, penetrant was placed on the inside peeled surface. The photo in FIG. 4A shows the inner cell surface of one of the PS foam sheets. This surface has open cells, and when exposed to iodine penetrant, the penetrant wicked into the foam. When penetrant was placed on the outside surface of the foam as shown in the photo of FIG. 4B, it did not penetrate, as there were no closed cells on the outside surface.

In these products, the foam was extruded, and later laminated with a multi-layer film to provide an oxygen barrier for making a modified atmospheric meat tray. The thermoforming operation produces scrap from the skeleton strips around the trays. This scrap can end up being the percentages given above, and is recycled into the foam.

Example 3

A co-extruded structure of three layers A/B/A. Layers A were STRYON® 685D polystyrene foamed with approximately 3% isopentane, and ½% of a chemical blowing agent, SAFOAM® FPE50, to serve as a cell nucleant, created foams of about 0.1 g/cc density. Average size of cells in the foam layer was approximately 0.005 inches diameter. Some cells were as large of 0.10 inches diameter.

Layer B was a 0.003 inch thick layer of LDPE, PETROTHENE® NA345-013, that was coextruded simultaneously with the two layers of A. The resulting out layers had a bimodal structure of approximately ½ the thickness being open cell foams, and ½ the thickness being closed cells. The open cells communicated with the surface that was in contact with the PE layer. Simply simply placing liquid iodine on the surface of the peeled foams could see this. When placed on the outer surface of the foam, the iodine would not penetrate into the foam. When placed on the inner-peeled-surface, the iodine would wick into the foam. This section could be later sliced open to visually determine how far the iodine penetrated, but just looking at the cross section where the slice had been made The penetrant was placed on a freshly cut surface of the total foam. It could clearly be seen that the penetrant soaked into the center portions of the structure, or in another way, it soaked into the center portions of the two sides of the foam. The photograph of FIG. 5A shows an enlarged cross section view of a PS foam sheet with a PE solid core. In the photograph of FIG. 5B there is shown one half of a piece of foam that has been peeled and that has had iodine solution placed on it. It can be seen where the penetrant was absorbed into the right side of the foam's open cells. The right side is of the foam is brown, whereas, the left side is closed cell and is not brown.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included with the scope of the appended claims. Although specific terms are employed herein, they are used in a generic and descriptive sense only and not for purposes of limitation.

That which is claimed is:

1. A multi-layer foam article comprising
a pair of extruded foam outer layers having open cells and closed cells, and an inner layer sandwiched between said pair of extruded foam outer layers, said pair of extruded foam outer layers being co-extruded with said inner layer and each extruded foam outer layer being predominantly open cell on one side and predominantly closed cell on the opposite side while the open cell side is adjacent to said inner layer, wherein said inner layer is capable of being readily separated from said extruded foam outer layers after extrusion and said closed cells form a waterproof layer.

2. The foam article according to claim 1 wherein said outer layers are at least one polymer is selected from the group consisting of a styrene polymer, a polyolefin polymer, a polyester, an ethylene/propylene terpolymer, polyvinyl chloride and polyphenylene oxide.

3. The foam article according to claim 1 wherein said outer layers are at least one polymer includes a styrene polymer selected from the group consisting of polystyrene, polystyrene copolymers, acrylonitrile/butadiene/styrene copolymer, styrene/maleic anhydride and high impact polystyrenes.

4. The foam article according to claim 1 wherein said inner layer is a polyethylene.

5. The foam article according to claim 1 wherein said foamed outer layer comprises at least 50% open cells.

6. The foam article according to claim 1 wherein the size of the pores in said open cells from about 0.005 inches diameter to about 0.020 inches in diameter.

7. The foam article according to claim 1 wherein the density of said foam is from about 0.05 g/cc to about 0.50 g/cc.

8. The foam article according to claim 1 wherein the foam has an average cell size of from about 0.05 inches diameter to about 0.10 inches in diameter, an overall open cell content of at least 50%, and a density of about 0.05 g/cc to about 0.50 g/cc.

9. A foam article with absorbing characteristics on one side and no-absorbing characteristics on the other side made by the process comprising:
(a) preparing a polymer melt with at least one polymer;
b) co-extruding a multi-layer structure having an inner layer and a pair of extruded foamed outer layers on either side of said inner layer, said extruding step cooling the outer surface of said extruded outer layers to form a pair of extruded foamed outer layers having at least 50% open cells and the remainder being closed cells with each extruded foam outer layer being predominantly open cell on one side and predominantly closed cell on the opposite side while the open cell side is adjacent to said inner layer with the open cells being adjacent said inner layer, wherein said inner layer is capable of being readily separated from said extruded foamed outer layers after extrusion, and said closed cells form a waterproof layer.

* * * * *

UNITED STATES PATENT AND TRADEMARK OFFICE
CERTIFICATE OF CORRECTION

PATENT NO. : 7,244,489 B2 Page 1 of 1
APPLICATION NO. : 10/436225
DATED : July 17, 2007
INVENTOR(S) : Owensby It is certified that error appears in the above-identified patent and that said Letters Patent is hereby corrected as shown below:

Column 4,
Line 20, "therrnoplastic" should read --thermoplastic--.

Column 8,
Line 58, "laver" should read --layer--;
Lines 58-59, after "laver" cancel "with the open cells being adjacent said inner layer".

Signed and Sealed this

Sixteenth Day of October, 2007

JON W. DUDAS
*Director of the United States Patent and Trademark Office*